United States Patent [19]

Balasubramanian et al.

[11] Patent Number: 5,006,625

[45] Date of Patent: Apr. 9, 1991

[54] PROCESS FOR PREPARING ORGANOSILAZANES

[75] Inventors: Mannarsamy Balasubramanian; Martin E. Gluckstein; Edwin D. Hornbaker, all of Baton Rouge, La.

[73] Assignee: Ethyl Corporation, Richmond, Va.

[21] Appl. No.: 374,058

[22] Filed: Jun. 30, 1989

[51] Int. Cl.$^5$ .............................. C08G 77/06
[52] U.S. Cl. ..................... 528/14; 528/10; 556/410
[58] Field of Search ............ 528/10, 14; 556/410

[56] References Cited

U.S. PATENT DOCUMENTS 4,482,669  11/1984  Seyferth et al. .................. 524/442
4,771,118  9/1988   Takamizawa et al. ............... 528/14
4,772,494  9/1988   Porte et al. ...................... 524/404

OTHER PUBLICATIONS

Zoeckler et al, J. Org. Chem. 1983, 48, 2539–2543.
Blum et al., Organometallics, 1986, 5, 2081–2086.

Primary Examiner—Melvyn I. Marquis
Attorney, Agent, or Firm—Patricia J. Hogan

[57] ABSTRACT

Organosilazanes having higher prepolymerization molecular weights are prepared by the ammonolysis of organohalosilanes at a temperature of about 15°–23° C. Their higher molecular weights facilitate the polymerization of the organosilazanes to preceramic polysilazanes.

12 Claims, No Drawings

PROCESS FOR PREPARING ORGANOSILAZANES

FIELD OF INVENTION

This invention relates to organosilazanes and more particularly to a process for increasing their molecular weights.

BACKGROUND

As disclosed, e.g., in U.S. Pat. Nos. 4,482,669 (Seyferth et al.) and 4,771,118 (Takamizawa et al.) and in Zoeckler et al., Journal of Organic Chemistry, Volume 48, pp. 2539-2541 (1983), and Blum et al., Organometallics, Volume 5, No. 10, pp. 2081-2086 (1986), it is known that organosilazanes are useful in the synthesis of organosilazane polymers and that they can be prepared by reacting an organohalosilane with ammonia in an organic solvent at a temperature in the range of 0° C. to −20° C.

It has now been discovered that the molecular weights of polysilazanes synthesized by the polymerization of such organosilazanes are dependent on the molecular weights of the organosilazane precursors as well as on the polymerization time and that the use of a lower molecular weight organosilazane necessitates a longer polymerization time to achieve a desired polysilazane molecular weight. It would therefore be desirable to find a means of increasing the molecular weights of organosilazanes prepared by an ammonolysis reaction.

SUMMARY OF INVENTION

An object of this invention is to provide a novel process for increasing the molecular weight of an organosilazane prepared by the ammonolysis of an organohalosilane in an organic solvent.

Another object is to provide such a process which reduces the time required to polymerize the product to a polysilazane having a desired molecular weight or which provides a higher molecular weight in a given time when using a metal hydride-catalyzed process.

These and other objects are attained by conducting the ammonolysis of an organohalosilane to an organosilazane in an organic solvent at a temperature of about 15°-23 C.

DETAILED DESCRIPTION

Except for the novel temperatures employed, the ammonolysis is conducted by known techniques, such as those of Seyferth et al. and Takamizawa et al., the teachings of both of which are incorporated herein in toto by reference. Thus, the organohalosilane may be any such compound capable of reacting with ammonia to form an organosilazane but is preferably one or more compounds selected from organodihalosilanes and organotrihalosilanes and is most preferably methyldichlorosilane. Also, the solvent maY be any suitable organic solvent but is usually a hydrocarbon, such as pentane, hexane, benzene, toluene, xylene, etc., or an ether, such as diethyl ether, tetrahydrofuran, tetrahydropyran, 1,4-dioxane, etc., and is preferably tetrahydrofuran. Moreover, as in the known reactions, it is desirable to feed the ammonia at a rate such as to permit control of the exothermic reaction and to conduct the reaction in a dry atmosphere.

The point of novelty of the invention is the use of a temperature of about 15°-23° C., preferably about 15°-20° C. The use of these temperatures leads to the formation of organosilazanes having higher molecular weights than corresponding ammonolysis products prepared at higher or lower temperatures, an effect that is surprising for two reasons. First, if it had been expected that the ammonolysis temperature would affect the molecular weight of the organosilazane, it would have been thought that the temperature effect would be consistent with a raising or lowering of the temperature rather than that there would be a peak in molecular weight at an intermediate temperature. Second, since the art suggests that one should maintain a low ammonolysis temperature, it would not have been anticipated that improved results would be obtained at higher temperatures.

After completion of the ammonolysis, the organosilazane produced may be polymerized to a polysilazane by known techniques, such as those of Seyferth et al. or Takamizawa et al. or analogous processes using the transition metal catalysts of Zoeckler et al. or Blum et al., the teachings of both of which are incorporated herein by reference. In the metal hydride catalyzed polymerization processes the organosilazanes prepared by the ammonolysis process of the present invention have the advantage of polymerizing to a given molecular weight in a shorter time or polymerizing to a higher molecular weight in a given time than organosilazanes prepared at higher or lower temperatures.

The following examples are given to illustrate the invention and are not intended as a limitation thereof.

EXAMPLE I

Part A

A suitable reaction vessel was charged with about 590 g of anhydrous tetrahydrofuran at about 20° C., after which 59.6 g (0.52 mol) of methyldichlorosilane was added, and stirring at about 200 rpm was begun. A slow steady stream of 27.8 g (1.63 mols) of anhydrous ammonia gas was introduced into the vessel at a flow rate such that the reaction temperature stayed at about 20° C. Then the reaction mixture was stirred at 20° C. for about 24 hours, after which the coolant flow to the reactor jacket was shut off, and the system was put under gentle nitrogen purge to allow the majority of the excess ammonia to vent off. Subsequently the reaction vessel was pressurized with sufficient nitrogen gas to force the product mass out of the reactor, and the products were filtered through a 0.2-micrometer filter. The molecular weight of the product as measured by GPC is shown in Table I.

Part B

The clear filtrate from Part A was discharged into a polymerization vessel and chilled to 0.C., and 0.373 g (0.009 mol) of potassium hydride powder was added to begin the polymerization. The progress of polymerization was monitored by taking aliquots of the reaction mixture at various time intervals and analyzing with GPC. The reaction mixture was maintained at 0° C. for 22 hours, after which the reaction was quenched by adding about 4.34 g of dimethylchlorosilane to the polymerization solution. The solution was then allowed to warm gradually to about 22° C. After about 24 hours, ammonia gas was purged through the solution to neutralize the excess quenching agent. The resulting solution was filtered by passing through a 0.2-micrometer filter. The molecular weight of the polymer as measured by GPC is shown in Table I.

EXAMPLE II (COMPARATIVE)

Four ammonolysis/polymerization series were conducted by repeating Example I except for using, respectively, −20° C., 0° C., 30° C., and 38° C. as the ammonolysis temperatures. The GPC molecular weights of the ammonolysis products and polymers are shown in Table I.

TABLE I

| Ammonolysis Temp., °C. | GPC Molecular Weight | |
|---|---|---|
| | Ammonolysis Product | Polymer |
| −20 | 240 | 6200 |
| 0 | 260 | 8500 |
| 20 | 280 | 12000 |
| 30 | 240 | 4900 |
| 38 | 205 | 6300 |

It is obvious that many variations may be made in the products and processes set forth above without departing from the spirit and scope of this invention.

What is claimed is:

1. In a process for preparing an organosilazane by reacting an organohalosilane with ammonia in an organic solvent, the improvement which comprises increasing the molecular weight of the product by conducting the entire ammonolysis reaction at a temperature of about 15°–23° C.

2. The process of claim 1 wherein the organohalosilane is at least one compound selected from organodihalosilanes and organotrihalosilanes.

3. The process of claim 2 wherein the organohalosilane is methyldichlorosilane.

4. The process of claim 1 wherein the organic solvent is tetrahydrofuran.

5. The process of claim 1 wherein the reaction temperature is about 15°–20° C.

6. The process of claim 1 wherein the organohalosilane is methyldichlorosilane, the organic solvent is tetrahydrofuran, and the reaction temperature is about 15°–20° C.

7. In a process for preparing a polysilazane by reacting an organohalosilane with ammonia in an organic solvent to form an organosilazane, adding a metal hydride catalyst to the resultant reaction mixture, and polymerizing the organosilazane, the improvement which comprises increasing the prepolymerization molecular weight of the organosilazane and expediting the polymerization by conducting the entire ammonolysis reaction at a temperature of about 15°–23° C.

8. The process of claim 7 wherein the organohalosilane is at least one compound selected from organodihalosilanes and organotrihalosilanes.

9. The process of claim 8 wherein the organohalosilane is methyldichlorosilane.

10. The process of claim 7 wherein the organic solvent is tetrahydrofuran.

11. The process of claim 7 wherein the ammonolysis temperature is about 15°–20° C.

12. The process of claim 7 wherein the organohalosilane is methyldichlorosilane, the organic solvent is tetrahydrofuran, and the ammonolysis temperature is about 15°–20° C.

* * * * *